United States Patent
Weaver et al.

[15] 3,656,260
[45] Apr. 18, 1972

[54] CHANNEL HELD WEATHER SEAL

[72] Inventors: John L. Weaver, Rochester; Edward H. Smoot, Holcombe, both of N.Y.

[73] Assignee: The Schlegel Manufacturing Company, Rochester, N.Y.

[22] Filed: Oct. 26, 1970

[21] Appl. No.: 84,063

[52] U.S. Cl..............................................49/489, 49/498
[51] Int. Cl..............................................E06b 7/23
[58] Field of Search.................49/489, 488, 495, 475, 488, 49/497, 485, 498

[56]  References Cited

UNITED STATES PATENTS

| | | | |
|---|---|---|---|
| 1,877,729 | 9/1932 | Chaffee | 49/489 X |
| 2,622,286 | 12/1952 | Beck | 49/489 X |
| 3,378,958 | 4/1968 | Parks et al. | 49/489 |

Primary Examiner—David J. Williamowsky
Assistant Examiner—Philip C. Kannan
Attorney—Cumpston, Shaw & Stephens

[57]  ABSTRACT

A weather seal to be secured in place in a channel has a relatively resilient, compressible, and soft sealing arm extending out beyond the open side of the channel for sealing purposes, and extending into the channel under an inturned lip along the open side of the channel. A firm and resilient base integral with the sealing arm is forcibly deformed to fit into the channel, and is stressed by the channel to compress the soft material tightly against the under side of the inturned lip to seal the soft material to the channel.

5 Claims, 3 Drawing Figures

PATENTED APR 18 1972 3,656,260

INVENTORS
JOHN L. WEAVER
EDWARD H. SMOOT
BY Cumpston, Shaw
and Stephens
ATTORNEYS

CHANNEL HELD WEATHER SEAL

THE INVENTIVE IMPROVEMENT

Channel held weather seals are used in many places, and one popular application is the weather seal fitting in a channel under the cover of an automotive luggage compartment to seal the cover closed. Automotive door seals are another common application. At present, extruded lengths of sealing strip of a relatively soft and resilient cellular polymeric material are secured in such a channel, and adhesive is used along each edge of the strip and at the bottom of the strip between the strip and the channel wall to secure the strip permanently in place and seal the junction between the strip and the channel.

The invention involves discovery of a new construction for such a sealing strip to eliminate the need for a separate and additional application of adhesive. The invention involves the discovery of a sealing strip construction that automatically seals itself tightly in a channel without adhesive, and the invention aims at lower cost of material and installation, and improved weather sealing.

SUMMARY OF THE INVENTION

The inventive weather seal fits in a channel of relatively rigid material in a region to be sealed, and the channel has an inturned lip adjacent its open side. The sealing strip is an extruded length of flexible material secured in the channel to accomplish the desired sealing. The strip has a relatively soft, compressible, and resilient sealing arm extending outward from the open side of the channel, and the soft material of the sealing arm extends under the lip inside the channel. The strip is also formed with a relatively firm and resilient base forcibly deformed to fit into the channel, and the base is stressed by the channel to compress the soft material tightly against the under surface of the lip inside the channel to seal the soft material to the channel.

DRAWINGS

FIGS. 1 and 2 are cross-sectional views of preferred embodiments of the inventive sealing strip; and FIG. 3 is a cross-sectional view of the sealing strip of FIG. 1 secured in place in a channel to accomplish the desired sealing.

DETAILED DESCRIPTION:

Figure 1:
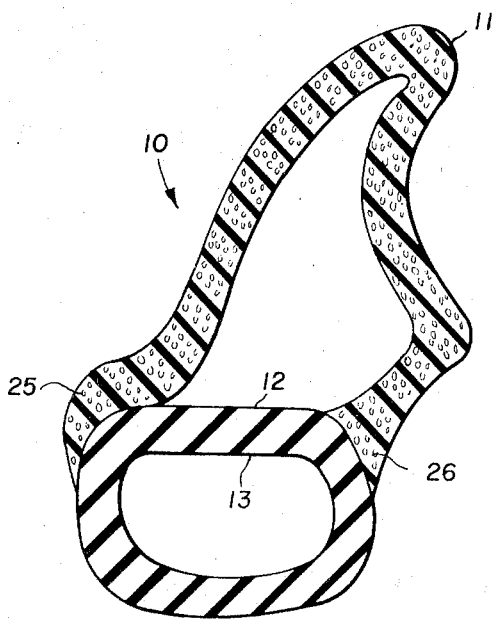

The sealing strip 10 of FIG. 1 is formed as an integral extrusion made in relatively long lengths that are cut and forced into channels for mounting and sealing. Although made in a single, integral extrusion, strip 10 is generally formed in two parts — a relatively soft, compressible, and resilient sealing arm 11, and a relatively firm and resilient base 12. Sealing arm 11 is preferably a spongy material such as a foamed or cellular polymer, and base 12 is preferably formed of a dense, unfoamed polymeric material. Cellular rubber is preferred for arm 11, and relatively firm and dense rubber is preferred for base 12.

Arm 11 can have many different shapes depending upon the sealing function it is to accomplish, and base 12 can also have different shapes depending upon the channel and requirements for strip 10. As shown in FIG. 1, base 12 has a hollow interior 13 so that it is generally tubular in cross section.

Figure 2:
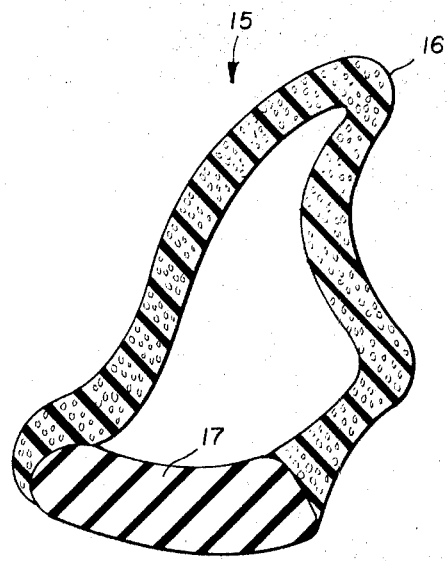

Strip 15, as illustrated in FIG. 2, is similar to strip 10 in having a sealing arm 16 of soft, compressible and resilient material and a base 17 of relatively firm and resilient material. Strip 15 illustrates that differences in cross-sectional shape can be used within the spirit of the invention, and shows that base 17 can be solid as illustrated.

Figure 3:
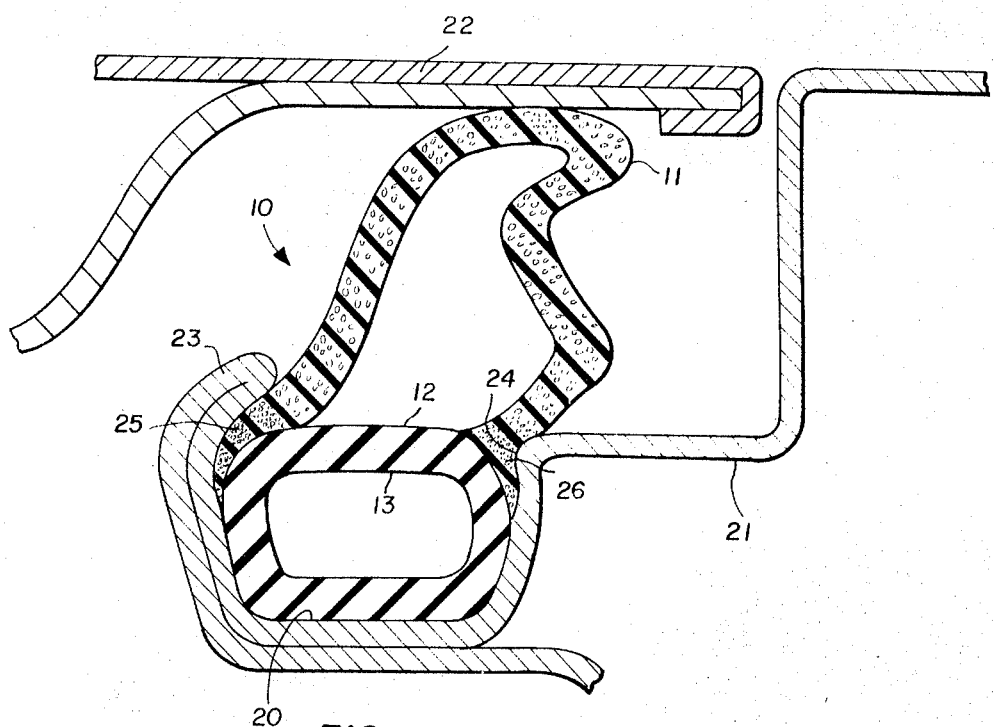

FIG. 3 shows strip 10 secured in channel 20 for sealing around the lid of an automotive luggage compartment. Channel 20 is generally formed in a sheet metal structure 21 under the lid 22 of a luggage compartment. With lid 22 closed as illustrated, sealing arm 11 is deformed as shown to press against the under side of lid 22 to accomplish sealing.

Sealing of strip 10 in channel 20 is also important, and is accomplished simply and easily according to the invention. Channel 20 has an inturned lip 23 adjacent its open side, and a smaller lip or indentation 24 along the opposite edge of its open side. The soft material of arm 11 extends outward from channel 20 past lips 23 and 24, and also extends inward under lips 23 and 24 on the inside of channel 20.

Base 12 is dimensioned relative to channel 20 so that it must be forcibly deformed to fit into channel 20 under lips 23 and 24. The resilience of base 12 is sufficient to allow it to be so deformed as it is pressed forcibly into channel 20. Base 12 is squeezed against the bottom and side walls of channel 20 and is under stress as positioned in channel 20 as to forcibly compress the soft material of arm 11 in the regions 25 and 26 respectively under lips 23 and 24 to press the soft material tightly against the under side of lips 23 and 24 to form an effective seal between strip 10 and channel 20. This eliminates the need for adhesive or sealing material between channel 20 and strip 10. The firmness of base material 12 is such that the stress placed on base 12 by its position in channel 20 presses the soft material against the under side of lips 23 and 24 with sufficient force to form an effective seal.

Soft material by itself could not produce sufficient compressive force to make a dependable seal, and and firmer material would not be compressible enough to be deformed tightly enough against the channel for a complete seal, but the inventive combination accomplishes both of these functions, eliminates adhesive material, and reduces installation time.

Persons wishing to practice the invention should remember that other embodiments and variations can be adapted to particular circumstances. Even though one point of view is necessarily chosen in describing and defining the invention, this should not inhibit broader or related embodiments going beyond the semantic orientation of this application but falling within the spirit of the invention. For example, those skilled in the art will appreciate that the inventive seal can be mounted in many channels formed in many different ways, the sealing strip can be formed of many different materials, and its extrusion can be accomplished in several ways.

We claim:

1. A channel held weather seal comprising:
   a. a channel of relatively rigid material in a region to be sealed;
   b. said channel having an inturned lip adjacent its open side;
   c. an extruded length of flexible sealing strip secured in said channel for sealing in said region;
   d. said sealing strip having a relatively soft, compressible and resilient sealing arm extending outward from said open side of said channel;
   e. said soft material of said sealing arm extending under said lip inside said channel;
   f. said sealing strip having a relatively firm and resilient base forcibly deformed to fit into said channel;
   g. said base being stressed by said channel to compress said soft material tightly against the under surface of said lip inside said channel to seal said soft material to said channel.

2. The weather seal of claim 1 wherein said channel has a pair of said lips adjacent opposite edges of its open side, and said soft material is compressed tightly against the under surface of each of said lips inside said channel.

3. The weather seal of claim 1 wherein said base is hollow and generally tubular in cross section.

4. The weather seal of claim 1 wherein said base is solid.

5. The weather seal of claim 1 wherein said soft material is a cellular polymeric material and said firm material is relatively dense polymeric material.

* * * * *